United States Patent
Takinoiri et al.

(10) Patent No.: US 10,469,733 B2
(45) Date of Patent: Nov. 5, 2019

(54) IMAGING APPARATUS, CONTROL METHOD OF IMAGING APPARATUS, AND STORAGE MEDIUM STORING CONTROL PROGRAM OF IMAGING APPARATUS FOR CONTROLLING FOCUS-RELATED COMMUNICATIONS

(71) Applicant: Olympus Corporatoin, Hachioji-shi, Tokyo (JP)

(72) Inventors: Satoshi Takinoiri, Yokohama (JP); Tetsuo Kikuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 43 days.

(21) Appl. No.: 15/823,561

(22) Filed: Nov. 27, 2017

(65) Prior Publication Data

US 2018/0152621 A1 May 31, 2018

(30) Foreign Application Priority Data

Nov. 29, 2016 (JP) .................................. 2016-231784

(51) Int. Cl.
*H04N 5/232* (2006.01)
(52) U.S. Cl.
CPC ..... *H04N 5/23212* (2013.01); *H04N 5/23222* (2013.01); *H04N 5/23245* (2013.01); *H04N 5/23293* (2013.01)
(58) Field of Classification Search
CPC ....................... H04N 5/23212; H04N 5/23222

USPC .......................................................... 348/345
See application file for complete search history.

(56) References Cited

U.S. PATENT DOCUMENTS

2013/0329118 A1* 12/2013 Hongu ............... H04N 5/23209
348/345

FOREIGN PATENT DOCUMENTS

JP          5627652         11/2014

* cited by examiner

*Primary Examiner* — Usman A Khan
(74) *Attorney, Agent, or Firm* — John C. Pokotylo; Pokotylo Patent Services

(57) ABSTRACT

An imaging apparatus includes an imaging unit and a control unit. The imaging unit accumulates electric charges synchronously with an imaging control signal to generate an imaging signal. The control unit has a first communication mode and a second communication mode. The first communication mode communicates to acquire data of a lens unit and to send an instruction to the lens unit synchronously with the imaging control signal. The second communication mode communicates to acquire data of the lens unit and to send the instruction to the lens unit at any timing asynchronous with the imaging control signal. The control unit performs focus adjustment on the basis of the data received from the lens unit and the imaging signal. The control unit switches between the first communication mode and the second communication mode in response to a state of the focus adjustment.

19 Claims, 6 Drawing Sheets

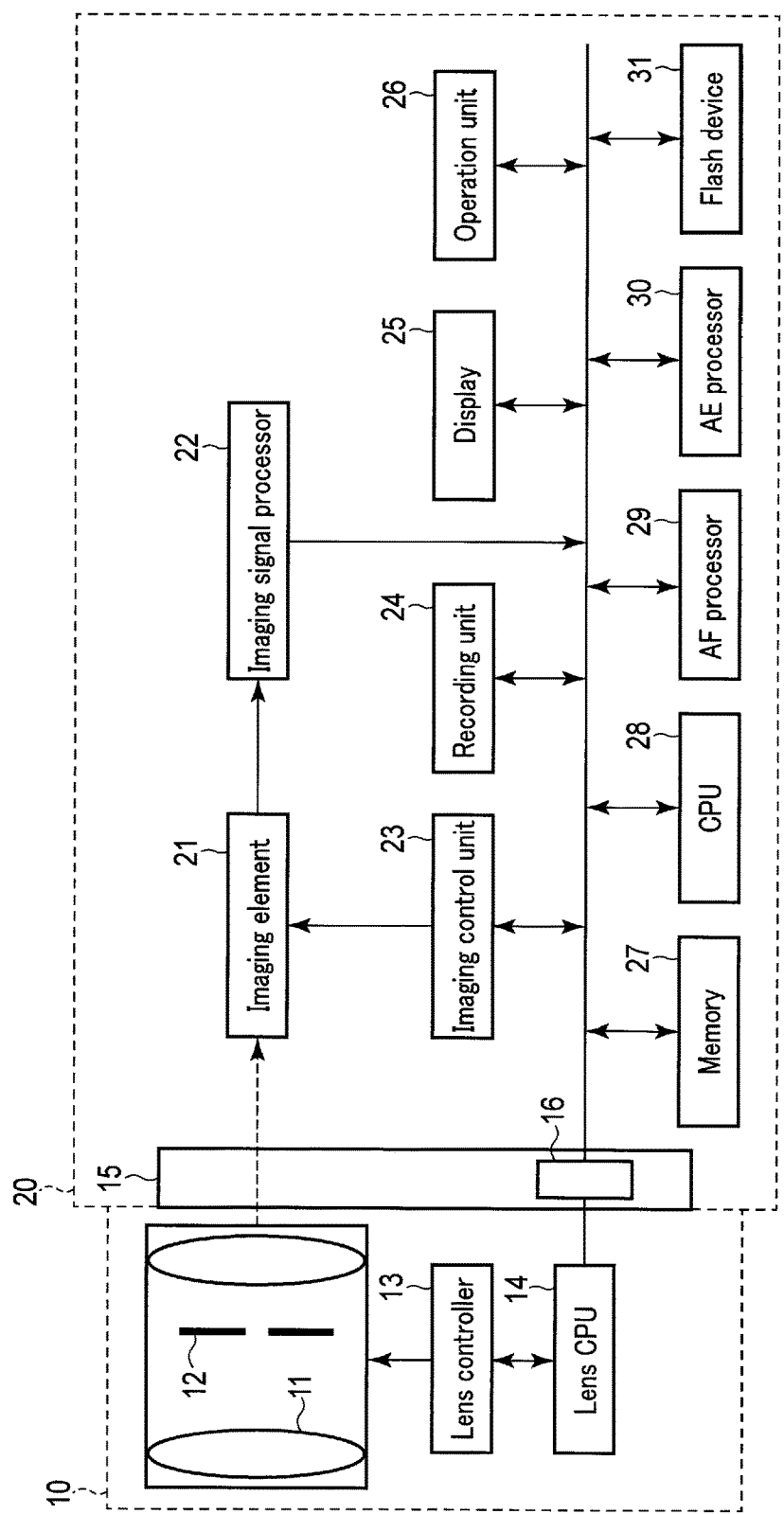
F I G. 1

IMAGING APPARATUS, CONTROL METHOD OF IMAGING APPARATUS, AND STORAGE MEDIUM STORING CONTROL PROGRAM OF IMAGING APPARATUS FOR CONTROLLING FOCUS-RELATED COMMUNICATIONS

CROSS-REFERENCE TO RELATED APPLICATIONS

This application is based upon and claims the benefit of priority from the prior Japanese Patent Application No. 2016-231784, filed Nov. 29, 2016, the entire contents of which are incorporated herein by reference.

BACKGROUND OF THE INVENTION

1. Field of the Invention

The present invention relates to an imaging apparatus, a control method of the imaging apparatus, and a storage medium storing a control program of the imaging apparatus.

2. Description of the Related Art

In still image photography, shortening of a photography time lag is required to enable quick photography at a timing intended by a user. One possible technique of shortening the photography time lag is to focus as quickly as possible when an instruction to start the still image photography by the user is detected.

An imaging apparatus according to Japanese Patent No. 5627652 communicates with an external lens using an asynchronous mode in which acquisition of data at a necessary timing can be requested when a predetermined operation (1st release operation) to instruct to adjust focus at the time of the still image photography is detected. The imaging apparatus communicates with the external lens in the asynchronous mode when an instruction for focus adjustment is detected, whereby the speed of AF can be increased.

BRIEF SUMMARY OF THE INVENTION

According to a first aspect of the invention, there is provided an imaging apparatus to which a lens unit including a focus lens is attached, the imaging apparatus comprising: an imaging unit which accumulates electric charges synchronously with an imaging control signal, and generates an imaging signal; and a control unit having a first communication mode which communicates to acquire data of the lens unit and to send an instruction to the lens unit synchronously with the imaging control signal, and a second communication mode which communicates to acquire data of the lens unit and to send the instruction to the lens unit at any timing asynchronous with the imaging control signal, the control unit performing focus adjustment on the basis of the data received from the lens unit and the imaging signal, wherein the control unit switches between the first communication mode and the second communication mode in response to a state of the focus adjustment.

According to a second aspect of the invention, there is provided an imaging apparatus to which a lens unit including a focus lens is attached, the imaging apparatus comprising: an imaging unit which accumulates electric charges synchronously with an imaging control signal, and generates an imaging signal; a control unit having a first communication mode which communicates to acquire data of the lens unit and to send an instruction to the lens unit synchronously with the imaging control signal, and a second communication mode which communicates to acquire data of the lens unit and to send the instruction to the lens unit at any timing asynchronous with the imaging control signal, the control unit performing focus adjustment on the basis of the data received from the lens unit and the imaging signal; a photography instruction detecting unit which detects an instruction for still image photography; and a continuous shooting mode setting unit which sets a continuous shooting photography mode, wherein the control unit communicates with the lens unit in the second communication mode to perform focus adjustment after detecting the instruction for still image photography, and the control unit switches to the first communication mode to perform focus adjustment when the continuous shooting photography mode is set and the control unit judges that it is in a state of forbidding a main exposure in the continuous shooting photography mode.

According to a third aspect of the invention, there is provided a control method of an imaging apparatus to which a lens unit having a focus lens is attached, the control method comprising: generating an imaging signal by an imaging unit synchronously with an imaging control signal; performing focus adjustment on the basis of data received from the lens unit and the imaging signal; and switching in response to a state of the focus adjustment between a first communication mode which communicates to acquire data of the lens unit and to send an instruction to the lens unit synchronously with the imaging control signal, and a second communication mode which communicates to acquire data of the lens unit and to send the instruction to the lens unit at any timing asynchronous with the imaging control signal.

According to a fourth aspect of the invention, there is provided a computer-readable non-transitory storage medium storing a control program of an imaging apparatus to which a lens unit having a focus lens is attached, the control program comprising: generating an imaging signal by an imaging unit synchronously with an imaging control signal; performing focus adjustment on the basis of data received from the lens unit and the imaging signal; and switching in response to a state of the focus adjustment between a first communication mode which communicates to acquire data of the lens unit and to send an instruction to the lens unit synchronously with the imaging control signal, and a second communication mode which communicates to acquire data of the lens unit and to send the instruction to the lens unit at any timing asynchronous with the imaging control signal.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute apart of the specification, illustrate embodiments of the invention, and together with the general description given above and the detailed description of the embodiments given below, serve to explain the principles of the invention.

FIG. 1 is a block diagram showing the configuration of an imaging apparatus according to one embodiment of the present invention;

DETAILED DESCRIPTION OF THE INVENTION

Figure 2:
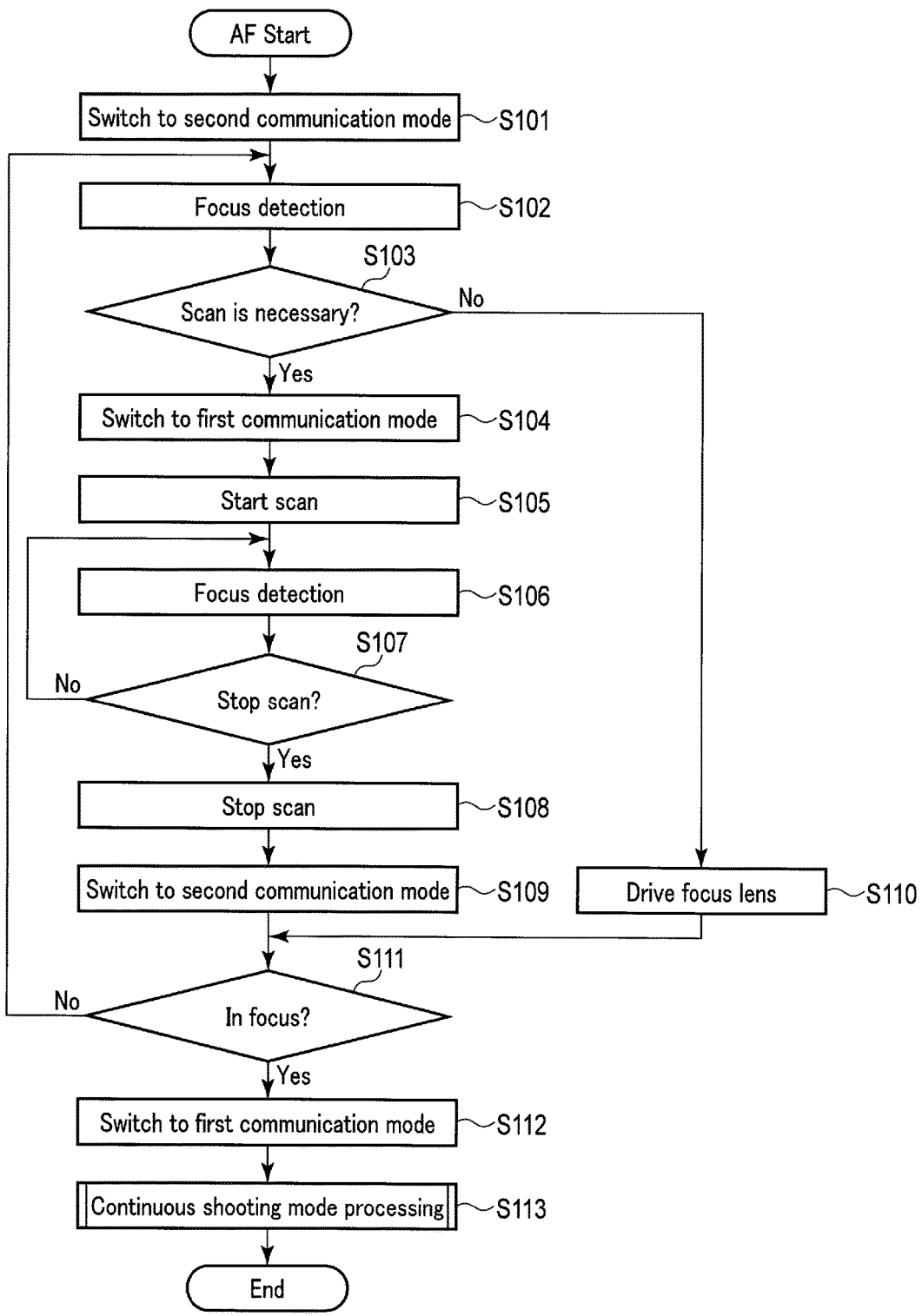
FIG. 2 is a flowchart showing an operation of the imaging apparatus according to one embodiment of the present invention.

Hereinafter, an embodiment of the present invention will be described with reference to the drawings. FIG. 1 is a block diagram showing the configuration of an imaging apparatus according to one embodiment of the present invention. The imaging apparatus includes various imaging apparatuses having focus lenses, in addition to devices such as a digital camera and a smartphone.

The imaging apparatus in FIG. 1 includes an interchangeable lens 10 and a camera main body 20. The interchangeable lens 10 and the camera main body 20 are electrically connected to each other via a contact 16 provided in a mount 15 of the camera main body 20.

The interchangeable lens 10 includes a lens unit, a lens controller 13, and a lens CPU 14. Although not shown, the interchangeable lens 10 includes a storage unit to store lens information which is information regarding lenses constituting the lens unit, and programs and parameters or the like necessary for the operation of the interchangeable lens 10. This storage unit is provided in, for example, the lens CPU 14. Naturally, this storage unit may be provided separately from the lens CPU 14. Further, each block of the interchangeable lens 10 comprises, for example, hardware. However, some of the blocks do not necessarily need to comprise the hardware, and may comprise software. Moreover, each block of the interchangeable lens 10 does not need to comprise a piece of hardware or software, and may comprise pieces of hardware or software.

The lens unit is an optical system to form a light flux from a subject into an image on an imaging element 21 of the camera main body 20. The lens unit includes one or more lenses including a focus lens 11, and an aperture 12. Herein, the optical system that constitutes the lens unit may comprise a zoom lens. The aperture 12 is configured to be variable in its diameter, and regulates the light flux from the subject entering the imaging element 21.

The lens controller 13 includes a motor or the like, and drives the focus lens 11 of the lens unit or drives the aperture 12 on the basis of a control signal from the lens CPU 14.

The lens CPU 14 is configured to be able to communicate with a CPU 28 of the camera main body 20 via the contact 16. The lens CPU 14 controls the lens controller 13 under the control of the CPU 28. The lens CPU 14 does not necessarily need to be a CPU, and may comprise an ASIC, FPGA, or the like.

The camera main body 20 has the imaging element 21, an imaging signal processor 22, an imaging control unit 23, a recording unit 24, a display 25, an operation unit 26, a memory 27, the CPU 28, an AF processor 29, an AE processor 30, and a flash device 31. Although not shown, the camera main body 20 includes a storage unit to store programs and parameters or the like necessary for the operation of the camera main body 20. This storage unit is provided in, for example, the CPU 28. Naturally, this storage unit may be provided separately from the CPU 28. Further, each block of the camera main body 20 comprises, for example, hardware. However, some of the blocks do not necessarily need to comprise the hardware, and may comprise software. Moreover, each block of the camera main body 20 does not need to comprise a piece of hardware or software, and may comprise pieces of hardware or software.

The imaging element 21 as an imaging unit is disposed on an optical axis of the lens unit and in the vicinity of a position of image formation of a subject figure. The imaging element 21 comprises two-dimensionally arrayed pixels. Each of the pixels has a photoelectrical converter comprising a photodiode or the like, and converts the subject image (optical image) into an electric signal. Herein, the pixels of the imaging element 21 may include a focus detection pixel. The focus detection pixel is configured to restrict, for example, the incoming direction of an incoming light flux. One configuration of the focus detection pixel restricts the incoming direction of the light flux by, for example, a pupil splitting system using a microlens, and another configuration restricts the incoming direction of the light flux by blocking some of the pixels. In the present embodiment, a focus detection pixel having any configuration can be used. Note that in the following explanation, it is assumed that the pixels of the imaging element 21 include the focus detection pixel.

The imaging signal processor 22 performs various kinds of signal processing such as amplification processing for an imaging signal output from each of the pixels of the imaging element 21.

The imaging control unit 23 outputs an imaging control signal (a vertical synchronizing signal VD or the like) to the imaging element 21 in accordance with a control signal from the CPU 28, thereby controlling electric charge accumulation in each of the pixels of the imaging element 21, and controlling the reading of the imaging signal.

The recording unit 24 is, for example, a nonvolatile semiconductor memory. Various data generated in the camera main body 20 are recorded in the recording unit 24. For example, an image file obtained as a result of photography is recorded in the recording unit 24.

The display 25 is, for example, a liquid crystal display, and displays a live-view image obtained via the imaging element 21, and various images such as images recorded in the recording unit 24.

The operation unit 26 comprises various operational members which are operated by the user. The operation unit 26 includes various operational buttons such as a release button, a moving image button, a mode button, a selection key, and a power button, and various operational members such as a touch panel. The release button includes a 1st release switch and a 2nd release switch. The 1st release switch is a switch which turns on by half pressing (1st release operation) of the release button. By the turning on of the 1st release switch, an instruction for photography preparation including AF (focus adjustment) and AE (exposure adjustment) is given to the CPU 28 as a focus adjustment instruction detecting unit. The 2nd release switch is a switch which turns on by full pressing (2nd release operation) of the release button. By the turning on of the 2nd release switch, an instruction for still image photography is given to the CPU 28 as the instruction detecting unit. The moving image button is an operational member to issue an instruction for moving image photography. The mode button is an operational member to select photography setting of the imaging apparatus. The selection key is an operational member to select and decide an item on, for example, a menu screen. The power button is an operational member to turn on or off the power of the imaging apparatus. The touch panel is integrally formed on a display screen of the display 25, and detects a touch position of a finger or the like of the user on the display screen. The CPU 28 executes processing corresponding to the touch position of the finger or the like of the user. The touch panel functions as an example of a continuous shooting mode setting unit to switch the operation mode of the imaging apparatus to, for example, a continuous photography mode (continuous shooting mode), or a continuous shooting speed setting unit to set a continuous shooting speed. Naturally, the functions of the continuous shooting mode setting unit and the continuous shooting speed setting unit may be enabled by the operational member other than the touch panel.

The memory 27 is an electrically rewritable memory, and transitorily stores various data such as data processed in the imaging signal processor 22, and processed data in the AF processor 29 and the AE processor 30. During the continuous photography mode (continuous shooting mode), the memory 27 functions as a buffer for continuous shooting. The buffer for continuous shooting is a buffer for tasks necessary for various computations and the like such as image processing during the continuous shooting mode.

The CPU 28 controls the camera main body 20. For example, the CPU 28 controls the imaging control unit 23 and thereby controls the operation of the imaging element 21. The CPU 28 also starts an AF operation and an AE operation in response to the turning on of the 1st release switch, and starts the still image photography in response to the turning on of the 2nd release switch. Further, the CPU 28 switches the communication between the interchangeable lens 10 and the camera main body 20, between a first communication mode and a second communication mode. The first communication mode is a communication mode to communicate with the interchangeable lens 10 synchronously with the output of the imaging control signal from the imaging control unit 23. The second communication mode is a communication mode to communicate with the interchangeable lens 10 asynchronously with the output of the imaging control signal from the imaging control unit 23. Note that the CPU 28 does not necessarily need to be a CPU, and may comprise an ASIC, FPGA, or the like.

The AF processor 29 calculates an evaluation value of contrast from the imaging signal output from the imaging element 21 along with the driving of the focus lens 11. The AF processor 29 also calculates a difference direction (out-of-focus direction) and a difference amount (out-of-focus amount) up to an in-focus position from a phase difference between imaging signals output from, for example, a pair of focus detection pixels. The CPU 28 performs the AF operation using the evaluation value and the out-of-focus amount obtained by the AF processor 29.

The AE processor 30 calculates conditions of an aperture value and a shutter speed to correct the exposure of the imaging element 21 on the basis of subject luminance. The subject luminance is calculated from, for example, the imaging signal output from the imaging element 21. The subject luminance may be measured by an exclusive photometric sensor.

The flash device 31 emits illumination light to the subject, for example, when the subject luminance is low or when a photograph is taken against light.

An operation of the imaging apparatus according to the present embodiment is described below. FIG. 2 is a flowchart showing an operation of the imaging apparatus according to the present embodiment. FIG. 2 shows an operation during the continuous photography mode (continuous shooting mode) in particular. As described above, the operation mode of the imaging apparatus is switched to the continuous shooting mode by, for example, the operation of the touch panel. Herein, it goes without saying that the imaging apparatus according to the present embodiment may be capable of not only operating in the continuous shooting mode but also operating in a single shooting mode.

The operation in FIG. 2 is started when the 1st release operation by the user is detected and then the 1st release switch is turned on. When the turning on of the 1st release switch is detected, the CPU 28 switches the communication mode to the second communication mode in step S101.

In step S102, the CPU 28 acquires the lens information from the lens CPU 14 in the second communication mode, and inputs the acquired lens information to the AF processor 29 so that focus detection is performed. Accordingly, the AF processor 29 calculates an out-of-focus amount and an out-of-focus direction up to the in-focus position with regard to the current position of the focus lens 11, from the acquired lens information and a phase difference calculated from the output of the focus detection pixel of the imaging element 21. Then the CPU 28 sends the out-of-focus amount and the out-of-focus direction to the lens CPU 14. Thereby, focus lens driving (driving of the focus lens 11 based on the out-of-focus amount and the out-of-focus direction) which will be described later is performed. When the focus detection and the focus lens driving alone are performed, a communication between the interchangeable lens 10 and the camera main body 20 is performed in the second communication mode asynchronous with the communication of the imaging control signal (synchronization signal). This makes it possible to shorten the time from the detection of the 1st release operation to the completion of the focus lens driving.

In step S103, the CPU 28 judges whether or not a scan operation of the focus lens 11 is necessary. The scan operation is judged to be necessary in the case of a failure in the focus detection such as a failure in the calculation of the out-of-focus amount, in the case of low reliability of the focus detection such as a low contrast condition, and in the case of a time immediately after the scan operation is stopped. When it is judged in step S103 that the scan operation is necessary, the processing proceeds to step S104. When it is judged in step S103 that the scan operation is unnecessary, the processing proceeds to step S110.

In step S104, the CPU 28 switches the communication mode to the first communication mode. In step S105, the CPU 28 starts the scan operation. In the scan operation, the CPU 28 sends an instruction to the lens CPU 14 to drive the focus lens 11 in one direction (e.g., from a far side to a near side). Synchronously with this lens driving instruction, the CPU 28 decides a shutter speed of the imaging element 21 in accordance with the condition obtained by the AE processor 30 and sends an instruction to the imaging control unit 23 so that imaging by the imaging element 21 is started at the decided shutter speed. Accordingly, the imaging control unit 23 outputs the imaging control signal to the imaging element 21. Then the CPU 28 causes the AF processor 29 to calculate the evaluation value of contrast in accordance with the imaging signal which is obtained from the imaging element 21 along with the driving of the focus lens 11. In the case of a hybrid type, the CPU 28 determines a driving direction of the focus lens 11 in the scan operation on the basis of a change of this evaluation value. After determining the driving direction of the focus lens 11, the CPU 28 sends an instruction to the lens CPU 14 to drive the focus lens 11 in this driving direction. In response to this instruction, the lens CPU 14 drives the focus lens 11.

In step S106, the CPU 28 causes the AF processor 29 to perform focus detection. That is, in the present embodiment, so-called overlap control under which focus detection is performed during the scan operation of the focus lens 11 is performed. As described above, for the communication at the time of focus detection during the scan operation, the communication between the interchangeable lens 10 and the camera main body 20 is performed in the first communication mode synchronous with the communication of the imaging control signal. Thereby, the AF processor 29 can associate the position of the focus lens 11 during the scan operation with time, and associate the timing of the focus detection with time, and can acquire the precise current position of the focus lens 11 at the focus detection timing.

In step S107, the CPU 28 judges whether or not to stop the scan operation. For example, when the focus detection during the scan operation can be highly reliably performed, when a peak of the evaluation value (a change from the increase of the evaluation value to its decrease) is detected, or when the focus lens 11 is driven to an end point, the scan operation is judged to be stopped. In the present embodiment, the scan operation is stopped at the time when a highly reliable focus detection operation can be performed, even if the peak of the evaluation value can not be detected. When it is judged in step S107 that the scan operation is not to be stopped, the processing returns to step S106. In this case, the scan operation and the focus detection are continued. When it is judged in step S107 that the scan operation is to be stopped, the processing proceeds to step S108.

In step S108, the CPU 28 stops the scan operation. In step S109, the CPU 28 switches the communication mode to the second communication mode. Then the processing proceeds to step S111.

Furthermore, when it is judged in step S103 that the scan operation is unnecessary, that is, when a reliable focus detection result is obtained, the CPU 28 instructs the lens CPU 14 to drive the focus lens 11 on the basis of the out-of-focus amount and the out-of-focus direction calculated by the AF processor 29. The communication mode at this point is the second communication mode. In response to this instruction, the lens CPU 14 drives the focus lens 11. Thus, the focus detection result can be indicated to the lens CPU 14 regardless of the timing of the imaging control signal, so that an AF time lag can be reduced. Then the processing proceeds to step S111.

In step S111, the CPU 28 judges whether or not the focus lens 11 is in focus. For example, in step S111, the focus lens 11 is judged to be in focus when the scan operation is stopped by the detection of the peak of the evaluation value. In this instance, the CPU 28 calculates a true in-focus position from a position of the focus lens 11 corresponding to the peak of the evaluation value and positions therearound, and instructs the lens CPU 14 to drive the focus lens 11 up to the calculated in-focus position. In response to this instruction, the lens CPU 14 drives the focus lens 11. Then the processing proceeds to step S112. Moreover, it is also judged in step S111 that the focus lens 11 is in focus, for example, when it is judged that the out-of-focus amount is less than or equal to a predetermined threshold as a result of the driving of the focus lens 11 in step S110. In this case as well, the processing proceeds to step S112. When the peak of the evaluation value is not detected and the out-of-focus amount is judged to be higher than the threshold, it is judged that the focus lens 11 is out of focus. In this case, the processing returns to step S102. In this instance, the time from the next focus detection in step S102 to the completion of the focus lens driving can be shortened because the communication mode is switched to the second communication mode.

In step S112, the CPU 28 switches the communication mode to the first communication mode. Then the processing proceeds to step S113. In step S113, the CPU 28 performs continuous shooting mode processing. After the end of the continuous shooting mode processing, the processing in FIG. 2 ends.

Figure 3:
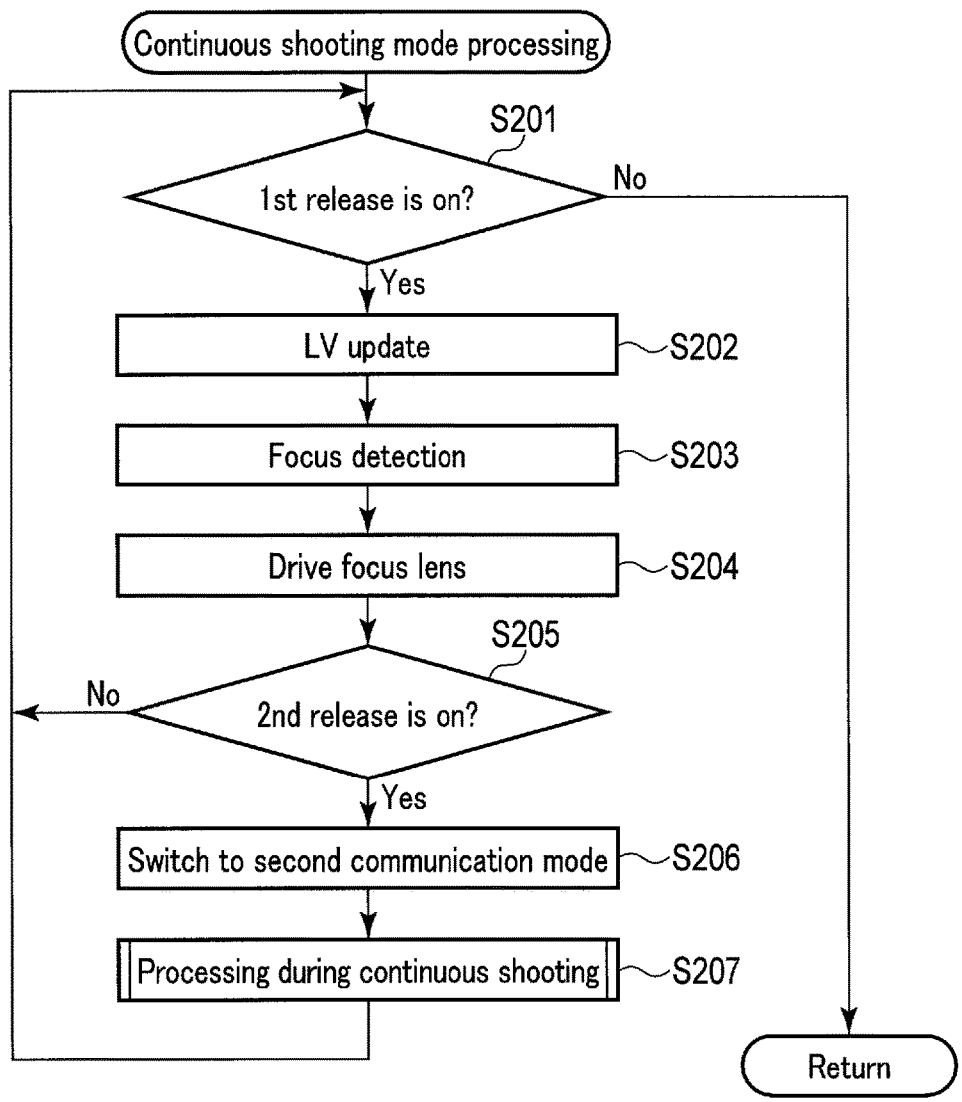
FIG. 3 is a flowchart showing an operation of continuous shooting mode processing.

The continuous shooting mode processing is described below. FIG. 3 is a flowchart showing an operation of the continuous shooting mode processing of the imaging apparatus according to the present embodiment.

In step S201, the CPU 28 judges whether or not the 1st release switch is on. When it is judged in step S201 that the 1st release switch is not on, the processing in FIG. 3 ends. In this instance, the processing in FIG. 2 also ends. When it is judged in step S201 that the 1st release switch is on, the processing proceeds to step S202.

In step S202, the CPU 28 updates a live view (LV) in the display 25. That is, the CPU 28 sends an instruction to the imaging control unit 23 so that the imaging by the imaging element 21 is started at the shutter speed obtained by the AE processor 30. Accordingly, the imaging control unit 23 outputs the imaging control signal to the imaging element 21. Further, the CPU 28 sends an aperture value (e.g. open aperture value) for live-view display to the lens CPU 14, to instruct to drive the aperture 12. Accordingly, the lens CPU 14 drives the aperture 12. Then the CPU 28 subjects, to necessary image processing, the imaging signal which is acquired via the imaging element 21, and inputs an image obtained by the image processing to the display 25, thereby updating the display of the display 25. Then the processing proceeds to step S203.

In step S203, the CPU 28 causes the AF processor 29 to perform focus detection. In step S204, the CPU 28 instructs the lens CPU 14 to drive the focus lens 11 on the basis of the out-of-focus amount and the out-of-focus direction calculated by the AF processor 29. In response to this instruction, the lens CPU 14 drives the focus lens 11. Then the processing proceeds to step S205. Note that as has been described above, the scan operation may be performed without the driving of the focus lens 11, for example, when the reliability of the focus detection by the AF processor 29 is low. In this case, the processing proceeds to step S205 after the completion of the scan operation.

Thus, in the present embodiment, while the 1st release switch is on, focus detection is also performed every frame in which the live view is updated. This makes it possible to improve subject trackability while the 1st release switch is on. Moreover, while the 1st release switch is on after once focusing is achieved, the communication between the interchangeable lens 10 and the camera main body 20 is performed in the first communication mode. Thereby, the CPU 28 communicates with the lens CPU 14 in response to the imaging control signal to acquire a position of the focus lens 11 and an aperture amount of the aperture 12, and can precisely manage the position of the focus lens 11 and the aperture amount of the aperture 12. Note that when a moving position of the subject is predicted in processing during continuous shooting which will be described later, it is necessary to acquire a precise change of the position of the focus lens 11. In the present embodiment, the communication at the time of the focus detection in step S203 is performed in the first communication mode, so that a precise change of the position of the focus lens 11 can be acquired.

In step S205, the CPU 28 judges whether or not the 2nd release operation by the user is detected and then the 2nd release switch is turned on. When it is judged in step S205 that the 2nd release switch is not on, the processing returns to step S201. When it is judged in step S205 that the 2nd release switch is on, the processing proceeds to step S206.

In step S206, the CPU 28 switches the communication mode to the second communication mode. Then the processing proceeds to step S207. In step S207, the CPU 28 performs the processing during continuous shooting. After the end of the processing during continuous shooting, the processing returns to step S201. Thus, while the 1st release switch is on after once focusing is achieved and until the 2nd release switch is turned on, the communication between the interchangeable lens 10 and the camera main body 20 is performed in the first communication mode. Thereby, the CPU 28 communicates with the lens CPU 14 in response to the imaging control signal to acquire a position of the focus lens 11 and an aperture amount of the aperture 12, and can precisely manage the position of the focus lens 11 and the aperture amount of the aperture 12. Moreover, since the live-view display is repeatedly performed during this time, visibility of the subject can be improved.

Figure 4:
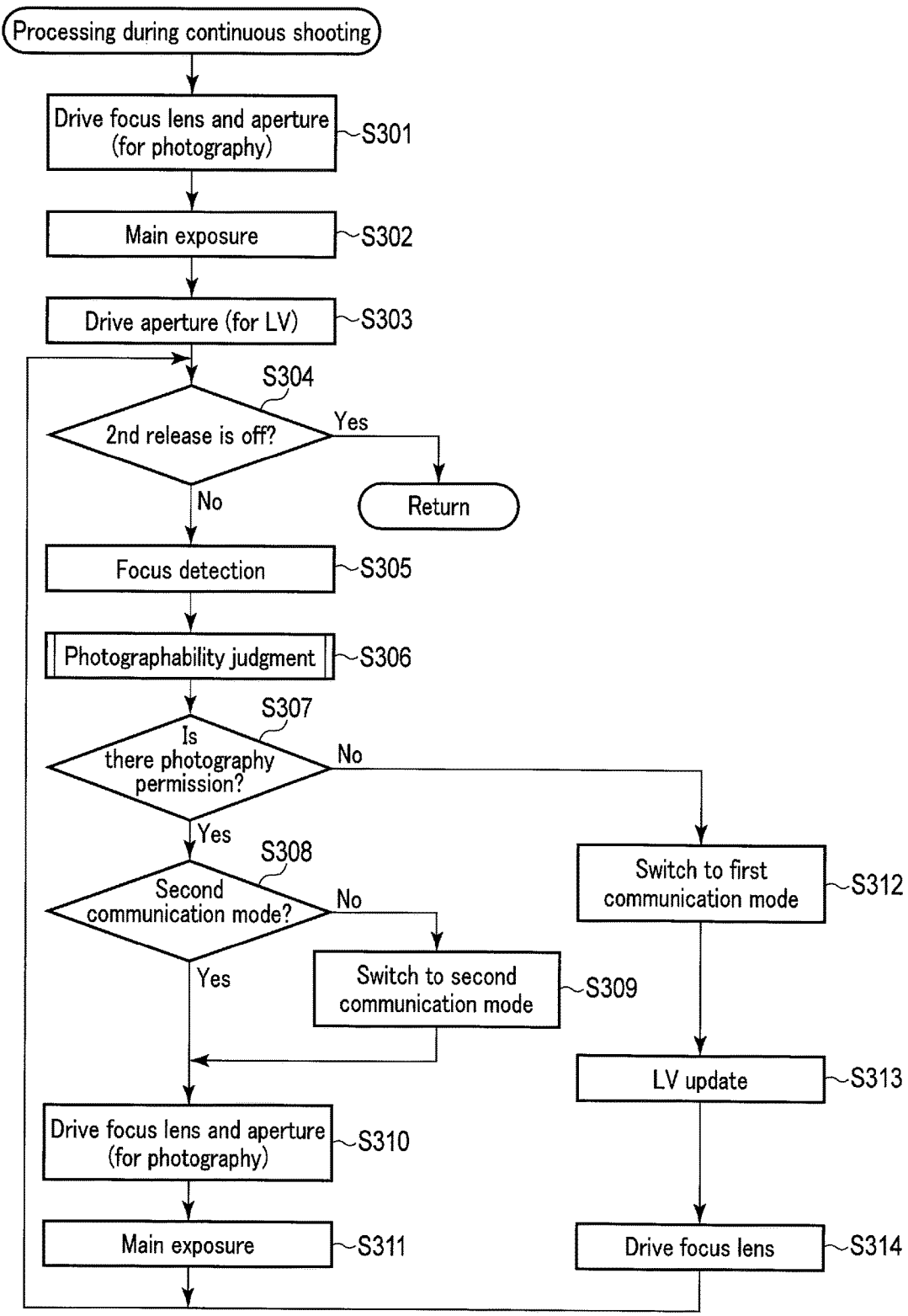
FIG. 4 is a flowchart showing an operation of processing during continuous shooting.

The processing during continuous shooting is described below. FIG. 4 is a flowchart showing an operation of the processing during continuous shooting of the imaging apparatus according to the present embodiment.

In step S301, the CPU 28 simultaneously drives the focus lens 11 and the aperture 12 for photography (main exposure). That is, the CPU 28 causes the AF processor 29 to predict a moving position of the subject. Accordingly, the AF processor 29 calculates a drive amount of the focus lens 11 necessary to bring the subject into focus at the current main exposure on the basis of the change of the drive position of the focus lens 11 in several past frames. The CPU 28 instructs the lens CPU 14 to drive the focus lens 11 on the basis of this drive amount. At the same time, the CPU 28 sends, to the lens CPU 14, an aperture value for photography (main exposure) obtained by the AE processor 30, to instruct to drive the aperture 12. Accordingly, the lens CPU 14 starts the driving of the focus lens 11 and the aperture 12. After the completion of the driving of the focus lens 11 and the aperture 12, the processing proceeds to step S302. Herein, the focus lens 11 and the aperture 12 are simultaneously driven in the second communication mode in step S301. In the second communication mode, an instruction to drive the focus lens 11 and the aperture 12 can be given at any timing asynchronous with the imaging control signal, so that there is no need to wait for the timing of the imaging control signal, and the time required to start the photography (main exposure) can be shortened.

In step S302, the CPU 28 performs the main exposure. That is, the CPU 28 sends, to the imaging control unit 23, an instruction to drive the imaging element 21 on the basis of a shutter speed for the photography (main exposure) obtained by the AE processor 30. Accordingly, the imaging control unit 23 outputs the imaging control signal to the imaging element 21. After the completion of the imaging, the CPU 28 subjects, to necessary image processing, the imaging signal which is acquired via the imaging element 21, and records, in the recording unit 24, an image file obtained by the image processing. Then the processing proceeds to step S303.

In step S303, the CPU 28 sends an aperture value for live-view display (e.g. open aperture value) to the lens CPU 14, to instruct to drive the aperture 12. Accordingly, the lens CPU 14 drives the aperture 12.

In step S304, the CPU 28 judges whether or not the 2nd release switch is turned off. When it is judged in step S304 that the 2nd release switch is off, the processing in FIG. 4 ends. In this instance, the processing returns to step S201 in FIG. 3. When it is judged in step S304 that the 2nd release switch is not turned off, the processing proceeds to step S305.

In step S305, the CPU 28 causes the AF processor 29 to perform focus detection. In step S306, the CPU 28 makes a photographability judgment. Then the processing proceeds to step S307. The photographability judgment is processing to judge whether or not photography (main exposure) of the next frame in continuous shooting can be performed. When it is judged as a result of the photographability judgment that the photography of the next frame can be performed, a photography permissible flag is put up. When it is judged as a result of the photographability judgment that the next photography can not be performed, a photography impermissible flag is put up. Details of the photographability judgment will be described later.

In step S307, the CPU 28 judges whether or not there is a photography permission, that is, whether or not the photography permissible flag is put up. When it is judged in step S307 that there is a photography permission, that is, the photography permissible flag is put up, the processing proceeds to step S308. When it is judged in step S307 that there is no photography permission, that is, the photography impermissible flag is put up, the processing proceeds to step S312.

In step S308, the CPU 28 judges whether or not the current communication mode is the second communication mode. When it is judged in step S308 that the current communication mode is not the second communication mode, the processing proceeds to step S309. When it is judged in step S308 that the current communication mode is the second communication mode, the processing proceeds to step S310.

In step S309, the CPU 28 switches the communication mode to the second communication mode. Then the processing proceeds to step S310. The communication mode is switched to the second communication mode in step S309 because the next photography (main exposure) and the subsequent focus detection are performed in the second communication mode.

In step S310, the CPU 28 simultaneously drives the focus lens 11 and the aperture 12 for photography (main exposure). In step S311, the CPU 28 performs the main exposure. Then the processing returns to step S304. The operations in steps S310 and S311 are similar to the operations in steps S301 and S302.

In step S312, the CPU 28 switches the communication mode to the first communication mode. Then the processing proceeds to step S313. In step S313, the CPU 28 updates the live view (LV) in the display 25. In step S314, the CPU 28 instructs the lens CPU 14 to drive the focus lens 11 on the basis of the out-of-focus amount and the out-of-focus direction calculated by the AF processor 29 in step S305. Accordingly, the lens CPU 14 starts the driving of the focus lens 11 (and the driving of the aperture 12 as well if necessary). After the completion of the driving of the focus lens 11, the processing returns to step S304. The operations in steps S313 and S314 are performed in the first communication mode. Therefore, the position of the focus lens 11 can be precisely managed. It is also possible to acquire the precise position of the focus lens 11 for the next focus detection. Moreover, when photography is not permitted, the processing from step S304 to step S314 is repeated until photography is permitted, so that the position of the focus lens 11 during this time can be precisely found.

Figure 5:
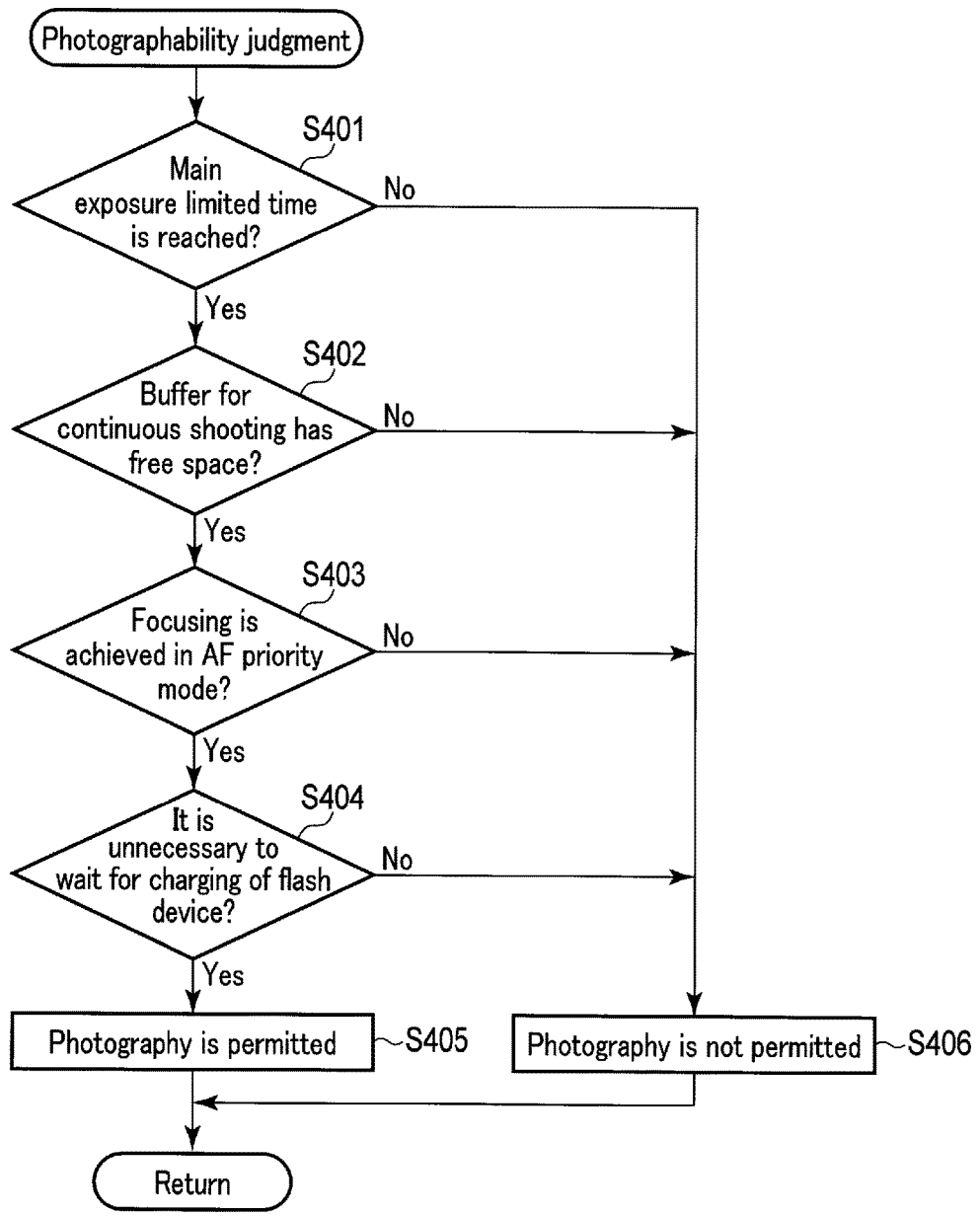
FIG. 5 is a flowchart showing an operation of photographability judgment.

The photographability judgment is described below. FIG. 5 is a flowchart showing an operation of the photographability judgment.

In step S401, the CPU 28 judges whether or not a main exposure limited time is reached. The main exposure limited time is, for example, a time indicating an interval of continuous shooting decided by a continuous shooting speed (the number of photography frames/second) set by the user. The main exposure limited time is shorter when the number of frames is larger. In addition, the photography of the next frame is kept waiting until the main exposure limited time is reached. When it is judged in step S401 that the main exposure limited time is reached, the processing proceeds to step S402. When it is judged that the main exposure limited time is not reached, the processing proceeds to step S406.

In step S402, the CPU 28 judges whether or not the buffer for continuous shooting formed in the memory 27 has any free space. When the buffer for continuous shooting does not have enough free space, processing for photography can not be performed. In this case, the photography of the next frame is kept waiting until free space can be secured in the buffer for continuous shooting. When it is judged in step S402 that the buffer for continuous shooting has free space, the processing proceeds to step S403. When it is judged that the buffer for continuous shooting has no free space, the processing proceeds to step S406.

In step S403, the CPU 28 judges whether or not the current photography mode is an AF priority mode and the focus lens 11 is in focus. There are imaging apparatuses in which photography priority and AF priority can be set as photography modes. The photography priority is a mode in which photography is performed whether the focus lens 11 is in focus or not. The AF priority mode is a mode in which photography is forbidden when the focus lens 11 is out of focus. That is, in the AF priority mode, if the focus lens 11 is out of focus, the photography of the next frame is kept waiting until the focus lens 11 comes into focus. When it is judged in step S403 that the current photography mode is the AF priority mode and the focus lens 11 is in focus, the processing proceeds to step S404. When it is judged in step S403 that the current photography mode is the AF priority mode and the focus lens 11 is out of focus, the processing proceeds to step S406. Note that when it is judged in step S403 that the current photography mode is the photography priority mode, the processing proceeds to step S404.

In step S404, the CPU 28 judges whether or not it is unnecessary to wait for the charging of the flash device 31. When the lighting of the flash device 31 is needed during continuous shooting or when the flash device 31 is not charged for the next lighting, the photography of the next frame is kept waiting until the flash device 31 becomes ready to light. When it is judged in step S404 that it is unnecessary to wait for the charging of the flash device 31, the processing proceeds to step S405. When it is judged in step S404 that it is necessary to wait for the charging of the flash device 31, the processing proceeds to step S406.

In step S405, the CPU 28 puts up the photography permissible flag. Then the processing in FIG. 5 ends. When the photography permissible flag is put up, step S307 is branched into step S308 where the photography of the next frame is performed. As described above, the communication mode at this point is switched to the second communication mode. In step S406, the CPU 28 puts up the photography impermissible flag. Then the processing in FIG. 5 ends. When the photography impermissible flag is put up, step S307 is branched into step S312. When the photography of the next frame is kept waiting, a live-view display period during a photography period of the next frame can be extended. In this instance, there are cases where the updating of the live view, focus detection, and the driving of the focus lens 11 may be performed as in steps S202 to S204. At this juncture, the communication mode is switched to the first communication mode as in steps S202 to S204.

Figure 6:
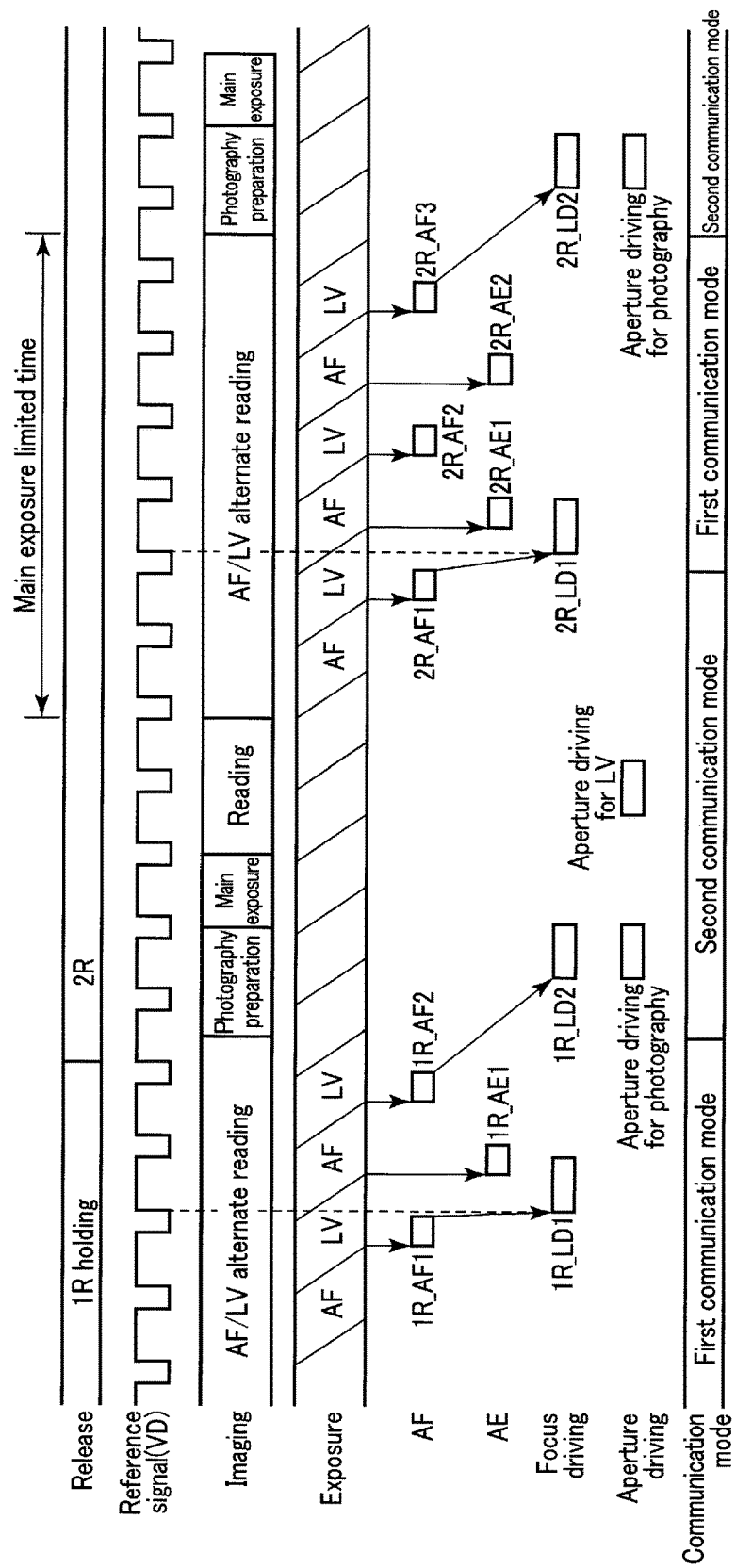
FIG. 6 is a timing chart showing an operation during a continuous shooting mode of the imaging apparatus according to one embodiment of the present invention.

FIG. 6 is a timing chart showing an operation during the continuous shooting mode of the imaging apparatus according to the present embodiment. Herein, "release" in FIG. 6 indicates the state of the release switches. Moreover, "reference signal (VD)" indicates the state of the imaging control signal. "Imaging" indicates the state of imaging. "Exposure" indicates the state of the imaging signal which is read from the imaging element 21. "AF" indicates the state of focus detection. "AE" indicates the state of the AE operation. "Focus driving" indicates the state of the driving of the focus lens 11. "Aperture driving" indicates the state of the driving of the aperture 12. "Communication mode" indicates the state of the communication mode.

When the 2nd release switch is not turned on and the 1st release switch is on (1R holding in FIG. 6), the updating of the live view and focus detection are repeated, as has been shown in FIG. 3. The communication mode in this instance is the first communication mode as has been shown in FIG. 2. Therefore, as shown in FIG. 6, focus detection is performed synchronously with the completion of the exposure for AF (1R_AF1 and 1R_AF2 in FIG. 6). Moreover, the driving of the focus lens 11 (1R_LD1 in FIG. 6) after the completion of focus detection is also performed synchronously with the imaging control signal. Thus, the position of the focus lens 11 every timing of focus detection is precisely managed so that the trackability of the subject during the live view can be improved. Although not shown in FIG. 6, it is preferable to manage the control of the aperture 12 by the first communication mode in order to display a more suitable live view that reflects the results of the AE operation for live view (1R_AE1 in FIG. 6).

When the 2nd release switch is turned on by the user (2R in FIG. 6), the communication mode is switched to the second communication mode. In this instance, photography preparation is performed. In the period of this photography preparation, the driving of the focus lens 11 (1R_LD2 in FIG. 6) and the driving of the aperture 12 for photography to the predicted positions which use the results of focus detection (1R_AF2 in FIG. 6) immediately before the 2nd release switch is turned on or which include the focus detection results in 1R_AF2 are performed. The driving of the focus lens 11 and the aperture 12 is performed in the second communication mode asynchronous with the imaging control signal. It is therefore possible to drive the focus lens 11 and the aperture 12 without affecting the main exposure. It is also possible to shorten a release time lag (a time from the turning on of the 2nd release switch to the start of the main exposure).

In the case of the continuous shooting mode, after the completion of the main exposure, the updating of the live view and focus detection are repeated until the main exposure limited time elapses. Herein, when there is an enough exposure time before the main exposure limited time at the point of the completion of the focus detection (after 2R_AF1 in FIG. 6), the communication mode is switched to the first communication mode. In this case, AF operations for live view (2R_AE1 and 2R_AE2 in FIG. 6) are performed as in 1R holding. Thus, suitable live-view display is performed. Further, focus detection (2R_AF2 and 2R_AF3) for the photography of the next frame is performed.

After the elapse of the main exposure limited time, the communication mode is switched to the second communication mode in which the photography of the next frame is performed. After this, a similar operation is repeated while the 2nd release switch is on.

As described above, according to the present embodiment, the communication mode is suitably switched in response to the state of focus adjustment between the first communication mode which communicates to acquire data from the interchangeable lens and to send an instruction to drive the focus lens synchronously with the imaging control signal, and the second communication mode which communicates to send the instruction to drive the focus lens asynchronously with the imaging control signal. It is thus possible to shorten the time for the AF operation and the time required to start photography.

Furthermore, during continuous photography, the communication mode is suitably switched between the first communication mode and the second communication mode in the live-view display during the main exposure as well, whereby the number of photography frames can be ensured, and yet the live-view display during photography can be suitably performed.

In the embodiment described above, the imaging apparatus includes an imaging apparatus such as a digital camera intended to record images. Nevertheless, the technique according to the present embodiment is applied to various imaging apparatuses including focus lenses, and is also applicable to imaging apparatuses which do not necessarily record images. In this respect, the technique according to the present embodiment is also applicable to imaging apparatuses such as an endoscope apparatus, a microscope apparatus, and a monitoring apparatus.

Each process according to the embodiment described above can also be stored as a program executable by the CPU 28 which is a computer. Otherwise, each process according to the embodiment described above can also be stored and distributed in a storage medium of an external storage device such as a magnetic disk, an optical disk, or a semiconductor memory. Then the CPU 28 reads the program stored in the storage medium of this external storage device, and the operation is controlled by this read program, whereby the processing described above can be performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus to which a lens unit including a focus lens is attached, the imaging apparatus comprising:
an imaging unit which accumulates electric charges synchronously with an imaging control signal, and generates an imaging signal; and
a control circuit configure to have a first communication mode which communicates to acquire data of the lens unit and to send an instruction to the lens unit synchronously with the imaging control signal, and a second communication mode which communicates to acquire data of the lens unit and to send the instruction to the lens unit at any timing asynchronous with the imaging control signal, the control circuit performing focus adjustment on the basis of the data received from the lens unit and a phase difference calculated from the imaging signal,
wherein the control circuit is further configured to
switch between the first communication mode and the second communication mode in response to a state of the focus adjustment, and
perform a focus adjustment operation by switching from the first communication mode to the second communication mode to perform the focus adjustment when detecting the instruction for the focus adjustment while communicating with the lens unit in the first communication mode, and perform a scan operation by switching to the first communication mode to perform the focus detection based on the phase difference calculated from the imaging signal obtained from the imaging unit while moving the focus lens in one direction, when calculation of the phase difference is judged as not reliable.

2. An imaging apparatus to which a lens unit including a focus lens is attached, the imaging apparatus comprising:
an imaging unit which accumulates electric charges synchronously with an imaging control signal, and generates an imaging signal;
a control circuit configured to have a first communication mode which communicates to acquire data of the lens unit and to send an instruction to the lens unit synchronously with the imaging control signal, and a second communication mode which communicates to acquire data of the lens unit and to send the instruction to the lens unit at any timing asynchronous with the imaging control signal, the control circuit performing focus adjustment on the basis of the data received from the lens unit and the imaging signal,
wherein the control circuit communicates with the lens unit in the second communication mode to perform focus adjustment after detecting the instruction for still image photography, and the control circuit switches to the first communication mode to perform focus adjustment when the continuous shooting photography mode is set, the instruction for still image photography is continuously detected, and the control circuit judges that it is in a state of forbidding a main exposure in the continuous shooting photography mode.

3. The imaging apparatus according to claim 2,
wherein the control circuit sets a continuous shooting speed in the continuous shooting photography mode, and
the state of forbidding the main exposure in the continuous shooting photography mode is a state where a start time of the main exposure corresponding to the set continuous shooting speed is not reached.

4. The imaging apparatus according to claim 2, further comprising a buffer to transitorily store image data acquired by the main exposure in the continuous shooting photography mode,
wherein the state of forbidding the main exposure in the continuous shooting photography mode is a state where the buffer is short of storage capacity.

5. The imaging apparatus according to claim 2, further comprising a flash device which emits auxiliary light for the still image photography,
wherein the state of forbidding the main exposure in the continuous shooting photography mode is a state where charging of the flash device is not completed.

6. The imaging apparatus according to claim 2, further comprising a display unit which performs display based on the imaging signal of the imaging unit,
wherein, when the control circuit switches to the first communication mode to perform focus adjustment, an imaging operation for focus adjustment and an imaging operation to perform display in the display unit are conducted in a time-series manner.

7. The imaging apparatus according to claim 2, wherein the control circuit sets either one of a mode prioritizing focus adjustment to perform photography after focusing by focus adjustment, and a mode prioritizing photography regardless of focusing by focus adjustment, and the control circuit judges that it is in a state of forbidding a main exposure in the continuous shooting photography mode when the focus adjustment is being performed and a focus is not obtained with prioritizing focus adjustment being set.

8. A control method of an imaging apparatus to which a lens unit having a focus lens is attached, the control method comprising:
generating an imaging signal by an imaging unit synchronously with an imaging control signal;
performing focus adjustment on the basis of data received from the lens unit and the imaging signal;
switching in response to a state of the focus adjustment between a first communication mode which communicates to acquire data of the lens unit and to send an instruction to the lens unit synchronously with the imaging control signal, and a second communication mode which communicates to acquire data of the lens unit and to send the instruction to the lens unit at any timing asynchronous with the imaging control signal;
detecting an instruction for still image photography;
setting a continuous shooting photography mode; and
communicating with the lens unit in the second communication mode to perform focus adjustment after detecting the instruction for still image photography, and switching to the first communication mode to perform focus adjustment when the continuous shooting photography mode is set, the instruction for still image photography is continuously detected, and it is judged that main exposure in the continuous shooting photography mode is in a state of being forbidden.

9. The imaging apparatus control method according to claim 8, the state of forbidding the main exposure in the continuous shooting photography mode is a state where a start time of the main exposure corresponding to the set continuous shooting speed is not reached.

10. The imaging apparatus control method according to claim 8, wherein the state of forbidding the main exposure in the continuous shooting photography mode is a state where a buffer is short of storage capacity, and the buffer is configured to transitorily store image data acquired by the main exposure in the continuous shooting photography mode.

11. The imaging apparatus control method according to claim 8, wherein the state of forbidding the main exposure in the continuous shooting photography mode is a state where charging of a flash device is not completed, and the flash device is configured to emit auxiliary light for the still image photography.

12. The imaging apparatus control method according to claim 8, further comprising conducting an imaging operation for focus adjustment and an imaging operation to perform display on a display unit in a time-series manner when switching to the first communication mode to perform focus adjustment.

13. The imaging apparatus control method according to claim 8, further comprising:
setting either one of a mode prioritizing focus adjustment to perform photography after focusing by focus adjustment, and a mode prioritizing photography regardless of focusing by focus adjustment; and
judging that it is in a state of forbidding a main exposure in the continuous shooting photography mode when the focus adjustment is being performed and a focus is not obtained, with the mode prioritizing focus adjustment being set.

14. A computer-readable non-transitory storage medium storing a control program of an imaging apparatus to which a lens unit having a focus lens is attached, the control program comprising:
generating an imaging signal by an imaging unit synchronously with an imaging control signal;
performing focus adjustment on the basis of data received from the lens unit and the imaging signal;
switching in response to a state of the focus adjustment between a first communication mode which communicates to acquire data of the lens unit and to send an instruction to the lens unit synchronously with the imaging control signal, and a second communication mode which communicates to acquire data of the lens unit and to send the instruction to the lens unit at any timing asynchronous with the imaging control signal;
detecting an instruction for still image photography;
setting a continuous shooting photography mode; and
communicating with the lens unit in the second communication mode to perform focus adjustment after detecting the instruction for still image photography, and switching to the first communication mode to perform focus adjustment when the continuous shooting photography mode is set, the instruction for still image photography is continuously detected, and it is judged that main exposure in the continuous shooting photography mode is in a state of being forbidden.

15. The computer-readable non-transitory storage medium according to claim 14, wherein the state of forbidding the main exposure in the continuous shooting photography mode is a state where a start time of the main exposure corresponding to the set continuous shooting speed is not reached.

16. The computer-readable non-transitory storage medium according to claim 14, wherein, wherein the state of forbidding the main exposure in the continuous shooting photography mode is a state where a buffer is short of storage capacity, and the buffer is configured to transitorily store image data acquired by the main exposure in the continuous shooting photography mode.

17. The computer-readable non-transitory storage medium according to claim 14, wherein the state of forbidding the main exposure in the continuous shooting photography mode is a state where charging of a flash device is not completed, and the flash device is configured to emit auxiliary light for the still image photography.

18. The computer-readable non-transitory storage medium according to claim 14, further comprising conducting an imaging operation for focus adjustment and an imaging operation to perform display on a display unit in a time-series manner when switching to the first communication mode to perform focus adjustment.

19. The computer-readable non-transitory storage medium according to claim 14, further comprising:
    setting either one of a mode prioritizing focus adjustment to perform photography after focusing by focus adjustment, and a mode prioritizing photography regardless of focusing by focus adjustment; and
    judging that it is in a state of forbidding a main exposure in the continuous shooting photography mode when the focus adjustment is being performed and a focus is not obtained, with the mode prioritizing focus adjustment being set.

\* \* \* \* \*